Figure 1:
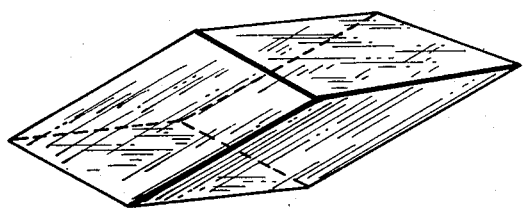

United States Patent Office 2,920,014
Patented Jan. 5, 1960

2,920,014

INSULIN CRYSTALS AND PREPARATIONS AND PROCESSES FOR PRODUCING THEM

Karl Petersen and Jorgen Schlichtkrull, Copenhagen, Denmark, assignors to Novo Terapeutisk Laboratorium A/S, Copenhagen, Denmark, a Danish joint stock company Application October 28, 1957, Serial No. 692,612

Claims priority, application Denmark June 23, 1952

13 Claims. (Cl. 167—75)

This application is a continuation-in-part of our application Serial No. 362,142, filed June 16, 1953, and now abandoned.

It is known to crystallize insulin from an aqueous medium which contains ions—in the following called M-ions—of one or more crystallization-promoting metals, such as zinc, cadmium, cobalt, nickel and copper ions, preferably zinc ions, and which has a pH-value within the range of 5 to 7. In the crystallization processes use is made of a buffer substance, usually sodium phosphate, sodium citrate, ammonium acetate or sodium acetate. With regard to the use of sodium phosphate buffer and ammonium acetate buffer reference may be made to U.S. Patent No. 2,143,590, and regarding the use of sodium citrate buffer reference may be made to U.S. Patent No. 2,626,228. Sometimes use is also made of an addition of organic solvents able to prevent precipitation of amorphous insulin. Examples of such solvents are acetone, propyl, butyl and amyl alcohol.

The insulin crystals produced by these processes contain M-ions chemically bound within the crystal structure itself, and the amount thereof varies dependent on the employed conditions of crystallization. It may be expressed as the number of metal atoms per unit cell, a unit cell being defined as the crystallographic unit containing 390 atoms of protein nitrogen. It may also be expressed as the percentage of metal in the dried crystals or as the number of milliequivalents of metal per gram of the dried crystals. By dried crystals is to be understood crystals having such a water content that they show a content of protein nitrogen of about 14.2%.

When use is made of citrate buffer as disclosed in U.S. Patent No. 2,626,228 crystals will be obtained containing 2 metal atoms per unit cell corresponding to 0.34% of zinc. When use is made of the process according to U.S. Patent No. 2,143,590, in which crystallization is effected in the presence of sodium phosphate buffer and recrystallization is effected in the presence of ammonium acetate buffer without any addition of zinc ions, recrystallized crystals will be obtained containing 3 metal atoms per unit cell of the crystals corresponding to 0.52% of zinc.

When the insulin is crystallized from a solution in the absence of zinc-precipitating substances, such as phosphate buffers, or in the absence of substances, such as citrate buffers, forming strongly complex zinc compounds, use being for instance made of sodium acetate buffer, and when use is made of a sufficiently high content of M-ions in the crystallization medium, crystals will be obtained containing up to 5 metal atoms per unit cell, which in the case of zinc corresponds to a zinc content of about 0.8%.

If the crystallization medium has such a high M-ion concentration that an insulin crystal after having been suspended therein will contain more than about 6 metal atoms per unit cell, insulin crystals will only be formed very slowly or not at all.

The insulin crystals produced by the processes described above are of rhombohedral structure but will very often not appear in the form of sharp-edged rhombohedra bounded by plane crystal faces. If the insulin contains impurities prior to the crystallization the resultant crystals will appear as rounded crystal bodies when insulin derived from pork pancreas glands has been used as starting material, and when insulin derived from bovine pancreas glands is used the resultant crystals will always have the form of twins, "stars" or deformed rhombohedra, even after recrystallization.

It is an object of the present invention to provide novel and useful insulin crystals.

Another object of the invention is to provide new and useful insulin preparations having a protracted effect and containing the new insulin crystals in aqueous suspension.

A still further object of the invention is to provide processes by which it is possible to arrive at insulin crystals having the form of sharp-edged rhombohedra bounded by plane crystal faces independent on the species of pancreas glands from which the insulin is derived.

While the hitherto produced crystals of insulin derived from bovine pancreas glands have the shape of twins, "stars" or deformed rhombohedra the bovine insulin crystal of our invention has the shape of a sharp-edged rhombohedron bounded by plane crystal faces, the obtuse angle of each of the rhombs being between 114° and 115°.

When the new bovine insulin crystals are produced by the processes of our invention they show a content of M-ions chemically bound within the crystal lattice, said content being at least 4 metal atoms per unit cell, corresponding to a zinc content of about 0.7%. However, the M-ion content may be removed after the crystals have been formed so that the novel crystals of our invention do not necessarily show any metal ion content. Thus, if the new insulin crystals containing 4 metal atoms per unit cell are suspended in water containing sodium citrate buffer (pH 6 to 7) the suspended crystals will only contain 2 metal atoms per unit cell, and if the crystals are washed with an acidified 20% sodium chloride solution (pH 2.5) all the M-ions will be removed from the crystals.

When insulin crystals produced as described in U.S. Patent No. 2,143,590 are suspended in distilled water and injected in rabbits, the obtained biological action can hardly be distinguished from the quick and short action of an insulin crystal solution (ordinary insulin), vide J. Pharm. 58, 93–104, 1936. On the other hand, if a water-soluble salt of a crystallization-promoting metal is added to the said insulin crystal suspension a strongly protracted effect will be obtained in that the suspended crystals at neutral reaction (the pH of the blood) will combine with the M-ions under formation of a slightly soluble and slowly resorbable insulin-metal-compound showing a metal content of at least 6 metal atoms per unit cell, corresponding to a metal content of at least 0.35 milliequivalent per gram of the dried crystals, vide e.g. Science, vol. 116, No. 3015, pages 394–398 (1952), and co-pending U.S. patent application Ser. No. 219,127, now Patent No. 2,882,202.

We have found that without the employment of an extra addition of M-ions to an insulin crystal suspension it is possible to produce a protracted effect of practical clinical value by only using our new bovine insulin crystals.

Figure 2:
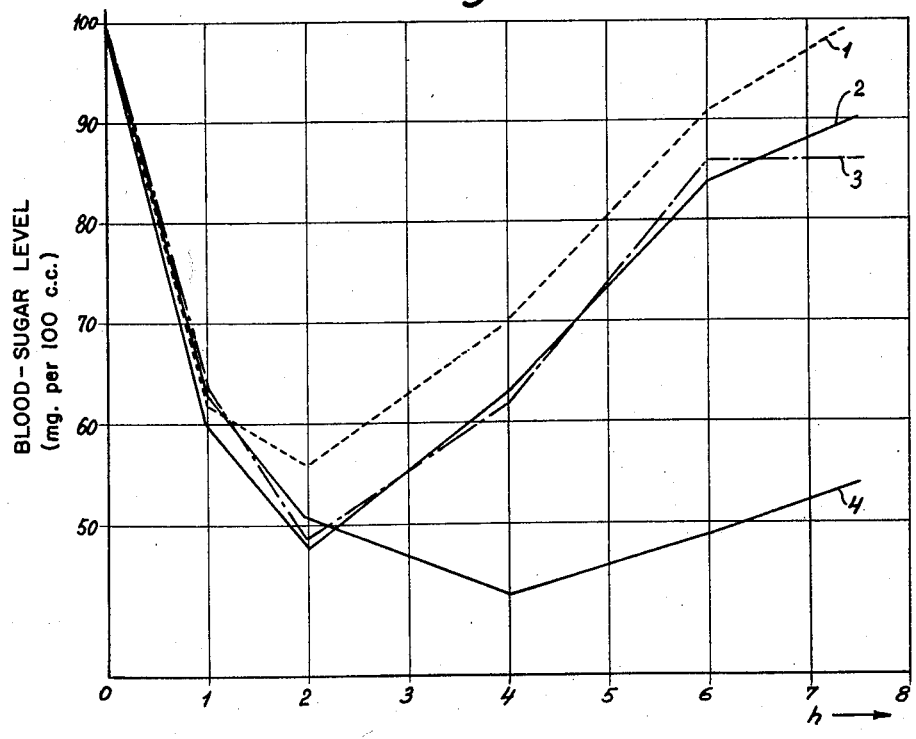

In order to illustrate the shape of our new insulin crystals and the new and useful biological effect which can be obtained by using the said crystals in aqueous suspension reference is made to the drawing on which Figure 1 shows on an enlarged scale a new insulin crystal of our invention, and Figure 2 shows blood-sugar curves on fasting rabbits which have been given an injection of different insulin crystal suspensions and ordinary insulin, i.e. crystalline insulin solution.

The crystal shown in Figure 1 is an ox insulin crystal having the shape of a sharp-edged rhombohedron bounded by plane crystal faces. The obtuse angle in each rhombus of the crystal is 114½°.

The blood sugar curves shown in Figure 2 are average curves from a series of experiments in which fasting rabbits have been given a subcutaneous injection of the same insulin dose (2 units) of different insulin preparations.

Curve 1 is obtained by injecting a solution of crystalline insulin in hydrochloric acid, said solution having a pH-value of about 3, a zinc content in the form of zinc chloride of 2.7 mgs. per 100 millilitres and a glucose content of 5%.

Curve 2 is obtained by injecting a suspension of star-shaped ox insulin crystals known per se in an aqueous medium without a content of added sodium chloride but with the employment of sodium acetate buffer and a pH-value of 5.5. The total zinc content of the suspension is 1.3 mgs. per 100 millilitres. The crystals employed are produced from an aqueous crystallization medium containing 0.5% of insulin, 40 mgs. of zinc (as chloride) per 100 millilitres, 0.05 M sodium citrate and 15% of acetone. The crystallization is effected at pH 6.2 and the produced crystals are separated from the crystallization medium, washed and dried. They show a zinc content of 0.34%.

Curve 3 is obtained by injecting an insulin crystal suspension which is produced as follows:

There is produced a sterile mixture containing 1.7% of insulin from ox pancreas, 0.013% of zinc in the form of zinc chloride, 0.1 M sodium acetate and 0.7% of sodium chloride together with so much sterile hydrochloric acid that the pH-value of the mixture will be 5.5. The insulin will crystallize from the mixture in the shape of stars, twins and like deformed rhombohedral bodies and will contain about 0.4% of zinc.

One part of the insulin crystal suspension thus produced is diluted with 9 parts of sterile water containing 0.11% of methyl-p-oxybenzoate and the pH-value is adjusted to 5.5.

It will be seen from Figure 2 that there is no noticeable difference in the effect between the solution of crystalline insulin and the two insulin crystal suspensions of curves 2 and 3.

Curve 4 is obtained by injecting an insulin crystal suspension which has been produced in the same manner as described in connection with curve 3, except that sodium chloride is present in a concentration of 7% during crystallization. As a consequence thereof the insulin will crystallize in the form of sharp-edged rhombohedra with plane crystal faces and contain 0.7% Zn when isolated from the crystallization medium and dried.

The effect of this insulin crystal suspension is distinctly protracted, the blood-sugar values at about 8 hours after the injection having only about half the magnitude of the value before the injection.

Thus, Figure 2 clearly shows that it is not necessary as has hitherto been presumed, in order to produce a protracted effect of insulin crystal suspensions, that such conditions prevail in the suspension medium that the suspended insulin crystals can take up zinc from the suspension medium to form insulin crystals with increased zinc content. It is sufficient that the insulin crystals are derived from bovine insulin and have the shape of sharp-edged rhombohedra bounded by plane crystal faces. This also applies when, instead of zinc, use is made of other crystallization-promoting metals.

Although our new bovine insulin crystals are substantially insoluble in an aqueous medium having a pH-value within the range of 5 to 8, we prefer to give the suspensions of our new bovine insulin crystals a pH-value between 6.5 and 7.5 since the suspensions are most stable within this limited pH-range.

The preparation of our new bovine insulin crystal suspensions for clinical use takes place under aseptic conditions. It is preferred to make the suspension medium isotonic, e.g. by means of sodium chloride, and to add a preserving agent, such as methyl-p-oxybenzoate. Use may also be made of a conventional buffer substance, such as an acetate, phosphate or citrate buffer. The insulin crystals are preferably produced with the employment of zinc as crystallization-promoting metal. Together with or instead of zinc it is, however, also possible to use other crystallization-promoting metals, such as nickel, cadmium, cobalt and copper.

The following examples illustrate how the crystal suspensions may be produced.

*Example 1*

There is produced a sterile mixture containing 1.7% of insulin from ox pancreas, 0.013% of zinc in the form of zinc chloride, 0.1 M sodium acetate and 7% of sodium chloride together with so much sterile hydrochloric acid that the pH-value of the mixture will be 5.5. The crystals thus produced have the form of sharp-edged rhombohedrons with plane crystal faces and contain about 0.7% of zinc corresponding to about 0.21 milli-equivalent of zinc per gram, and have a biological activity of about 23 international units per mg.

One part of the insulin crystal suspension thus produced is diluted with 9 parts of sterile water containing 0.11% of methyl-p-oxybenzoate, whereafter the pH-value of the suspension is changed to 7.0 by the addition of 1 N sodium hydroxide. The insulin crystals in this final suspension will show a zinc content of about 0.7%.

*Example 2*

The insulin crystals produced according to Example 1 are removed by suction from the crystallization medium and dried, whereafter 174 mgs. thereof are suspended in 100 millilitres of sterile water containing 0.7% of sodium chloride. The crystals remain undissolved. The pH-value of the suspension is about 6.

*Example 3*

There is produced a sterile mixture containing 1.7% of insulin from ox pancreas, 0.13% of zinc in the form of zinc chloride, 0.05 M sodium citrate and 7% of sodium chloride, and from this mixture insulin is caused to crystallize by adding so much sterile hydrochloric acid that the pH-value of the mixture will be 6. The crystals produced have the form of sharp-edged rhombohedrons with plane crystal faces and contain about 0.7% of zinc corresponding to about 0.21 milliequivalent of zinc per gram.

The insulin crystal suspension thus produced is diluted with so much sterile water containing 0.11% of methyl-p-oxybenzoate that the final crystal suspension will contain 40 international units of insulin per millilitre after the suspension has been adjusted to pH 7 by the addition of 1 N sodium hydroxide. Because of the content of citrate buffer in the crystallization medium the zinc content of the suspended crystals will not be increased when the suspension is adjusted to pH 7.

The insulin crystal suspension thus produced has a protracted effect corresponding to that of the suspension produced according to Example 1.

*Example 4*

The procedure in the first paragraph of Example 1 is followed, and the insulin crystal suspension produced is diluted with sterile water containing so much zinc in the form of zinc chloride and so much methyl-p-oxybenzoate that the final suspension after having been adjusted to pH 7.4 contains 8.6 mgs. of zinc per 100 millilitres and 0.1% of methyl-p-oxybenzoate. When the suspension is adjusted to pH 7.4, the insulin crystals will take up zinc from the medium so that they will contain about 2.3% of zinc corresponding to about 0.7 milliequivalent per gram. Then the crystals are removed by suction and dried whereafter 174 mgs. thereof are suspended in 100 millilitres of sterile water containing 0.7% of sodium chloride, 1/100 M sodium phosphate and 0.1% of methyl-p-oxybenzoate. Because of the presence of the phosphate buffer the zinc content of the crystals will decrease to below 0.8% without the crystals going into solution. The final suspension has a protracted degree corresponding to that of the suspension produced according to Example 1.

From a clinical point of view it is advantageous to have at one's disposal insulin preparations with different timing of action. This may according to our invention be obtained in various ways.

Firstly, the timing of action of the produced suspensions may be changed by the employment of insulin crystals of different origin, suspensions of insulin crystals derived from pork pancreas glands and even having the form of sharp-edged rhombohedrons bounded by plane crystal faces showing a relatively short time of action. Thus, it is possible to obtain a desired initial effect by employing insulin crystals among which a predetermined percentage originate from swine pancreas. By varying the weight proportion in the crystals between insulin originating from swine pancreas and insulin originating from ox pancreas it is possible within broad limits to vary the biological timing of the final suspension.

Secondly, the aqueous medium may be given a content of insulin crystals having the form of stars, deformed rhombohedrons, rhombehedral twins, lemons and similar rounded crystal bodies which alone in aqueous suspension would not show any noticeable protracted effect. By changing the content of such suspended insulin crystals it is possible to vary the initial effect and the protracted effect of the final suspension. The said quick-acting insulin crystals may be produced in a manner known per se, as mentioned above.

Thirdly, the duration of action of the produced crystal suspensions increases with increasing crystal size. When using small crystals, e.g. about 3μ, and larger crystals, e.g. 30μ, in varying weight proportions it is possible to vary the rate of resorption and hence the biological timing of the suspensions. Consequently, it is, according to the invention, appropriate to use insulin crystals having a predetermined size distribution.

Thus, by means of the present invention it is possible in an extremely simple way, only based on insulin crystals as such without the use of additional auxiliary substances, to produce insulin preparations having a polyphasic effect, i.e. containing both quick-acting and slow-acting components. The protracted effect may be provided alone by means of crystals having the shape of sharp-edged rhombohedrons with plane crystal faces, while an initial effect, if desired, may be obtained by the presence in the suspension of the known insulin crystals. Actually, by means of the present invention one has for the first time, without additional substances of any kind, succeeded in placing at the disposal of diabetes therapy insulin preparations consisting of an insulin crystal suspension having a protracted effect and being mixable in any proportion with a quick-acting insulin crystal suspension and with dissolved insulin.

Our invention also comprises various crystallization processes resulting in insulin crystals having the shape of sharp-edged rhombohedrons bounded by plane crystal faces and having a high purity.

We have found that the presence of the halogens, chlorine, bromine and/or iodine in ionogenic form in the crystallization medium can improve the conditions of crystallization to such a degree that the insulin, irrespective of origin and small amounts of impurities, crystallizes particularly pure and in rhombohedral shape as sharp-edged crystal bodies bounded by plane crystal faces. It will only be necessary, while retaining the usual conditions of crystallization, to ensure that the ionogenic halogen is present in a concentration above 0.2 mole per litre and not exceeding 4 moles per litre.

It is known, e.g. from British patent specification No. 643,300, page 3, lines 38 to 53, that the crystallization of zinc-protamine-insulin is accelerated by a certain salt concentration, which is greater than that obtained by mixing of the employed starting materials, the adjustment of pH etc. This increased salt concentration may be obtained by increased buffer concentration or by addition of a salt, such as sodium chloride, or an arbitrary selection of other salts.

However, our process does not relate to crystallization of a protamine insulin compound, but to crystallization of insulin itself. A casual selection of salts will not produce the effect obtained according to the invention, which effect is due to the presence of the halide ions in a definite minimum concentration, and has no relation to the speed of crystallization but to attainment of insulin crystals of particular purity and shape. Our process makes it possible always to obtain the insulin in the form of sharp-edged rhombohedra with plane crystal faces, regardless of whether the insulin originates from swine-, ox- or other pancreas glands.

The crystallization medium in most easily imparted the required content of the halide ions by addition of halogen salts. Particularly suitable as such are halogen salts of alkali metals, ammonia, alkaline earth metals or halidies of amines, such as triethanolamine. Halogen salts of heavy metals, such as zinc, are, on the other hand, not operative.

The presence in the crystallization medium of the halide ions in the above mentioned concentration is, however, not the only way in which to cause insulin to crystallize in the form of sharp-edged rhombohedrons bounded by plane crystal faces. We have found that this can also be obtained when the crystallization is effected in the presence of urea or formamide.

If insulin with a comparatively large content of impurities is employed for the crystallization and an organic solvent, such as an aliphatic ketone such as acetone, or an aliphatic alcohol such as propyl or butyl or amyl alcohol, is not present during the crystallization, insulin in amorphous form will frequently be precipitated together with the insulin crystals. Any such amorphously precipitated insulin may be solubilized by adding an organic solvent of the type referred to, particularly acetone.

The amount of precipitated amorphous insulin at the end of the crystallization process is also dependent on the halogen ion concentration and increases with increasing halogen ion concentration. When crystallizing on a commerical scale it will be appropriate not to use a halogen ion concentration above 2 to 4 moles per litre. The best results have been obtained with a halogen ion concentration between about 0.5 and about 1.5 moles per litre.

The crystallization process may, as previously mentioned, be effected in a manner known per se.

As known, crystallization of insulin requires the presence of certain metals (zinc, cobalt, nickel, cadmium, copper, manganese or iron) in the form of their bivalent ions. In practice, use has hitherto only been made of the presence of zinc, preferably in the form of a water-soluble zinc salt. In fixing the metal content of the crystallization medium it should be taken into consideration to which extent the insulin employed already contains zinc or similar metals. Regarding the amounts of metals necessary to cause crystallization reference is made to U.S. Patent No. 2,143,590.

In order to accomplish crystallization the pH-value of the aqueous crystallization medium is preferably adjusted to 5.4–6.2 by means of an acid, for example hydrochloric acid, or a base, for example sodium hydroxide, dependent on whether the crystallization medium has a higher or lower pH-value prior to the pH adjustment. The most common procedure is to approach the crystallization pH from the acidic side, but basic insulin solutions may also be employed, the pH-value of which is reduced to the crystallization range. It is also possible to use an aqueous suspension of amorphous insulin to which the necessary amount of ions of one or more of the metals referred to is added in order to cause crystallization.

A buffer substance or a mixture of such substances is generally used for fixing the crystallization pH. As examples of suitable buffer substances may be mentioned acetate buffer, borate buffer, citrate buffer, diethyl barbiturate buffer, maleate buffer, or mixtures hereof. The sodium salt or other alkali salts of acetic or citric acid are preferred buffers.

Relative to the quality of the insulin employed for crystallization it should be pointed out that the insulin should be as pure as possible. The insulin obtained through the usual commercial recovery of insulin from pancreas glands is ordinarily of a suitable purity. A purity of 20–23 international units per milligram is preferable. The insulin may be used in amorphous or crystalline condition. The best yields are obtained when crystalline insulin is used as starting material, so that our crystallization process becomes the last step in the process of production prior to or in connection with the preparation of insulin crystal suspension preparations for parenteral use in diabetes therapy.

The following examples illustrate our novel crystallization process.

Example 5

½ gram of amorphous insulin originating from ox-pancreas is dissolved in 50 millilitres of 0.02 N HCl, and to the solution are added 25 millilitres of an aqueous potassium iodide solution containing 27 grams of potassium iodide per 100 millilitres, and 10 millilitres of a citrate buffer containing 10% of citric acid as sodium citrate and 0.4% of zinc as chloride. The solution is diluted with water to give 100 millilitres, which results in a halogen ion concentration of about 0.43 mole per litre, and the pH is adjusted to 5.7–6.0. Crystallization commences immediately, and crystallization is accomplished after 1–2 days, and the crystals have the form of sharp-edged rhombohedrons bounded by plane crystal faces.

Example 6

½ gram of amorphous insulin originating from swine-pancreas is dissolved in 50 millilitres of 0.02 N HCl, and to this solution are added 10 millilitres of acetone and 25 millilitres of an aqueous sodium chloride solution containing 23 grams NaCl per 100 millilitres, and 10 millilitres of the same citrate buffer as in Example 5. The solution is diluted with water to give 100 millilitres, which results in a halogen ion concentration of about 1 mole per litre, and the pH is adjusted to 5.8–6.0. Crystallization occurs immediately and is accomplished in the course of 1–2 days. The crystals have the form of sharp-edged rhombohedrons bounded by plane crystal faces.

Example 7

½ gram of insulin crystals originating from swine-pancreas is dissolved in 250 millilitres of ⅓ N acetic acid. Approximately ¼ litre of ⅓ N ammonium hydroxide containing 6% of NaCl is then added to adjust the pH value to approximately 6.0 and to create a halogen ion concentration of about 0.51 mole per litre. Crystallization is accomplished in the course of about 24 hours, and the crystals have the form of sharp-edged rhombohedrons bounded by plane crystal faces.

Example 8

100 milligrams of crystalline insulin originating from ox-pancreas are dissolved in 10 millilitres of 0.1 N HCl, and to this solution are added 10 millilitres of a zinc chloride solution containing 0.5% of zinc. To this mixture are added 20 millilitres of an aqueous calcium chloride solution containing 7 grams of $CaCl_2$ per 100 millilitres, and then 10 millilitres of sodium acetate buffer containing 6.8 grams of $CH_3COONa.3H_2O$ and 20 millilitres of 1 N HCl per 100 millilitres are added. The halogen ion concentration will then be about 0.57 mole per litre. Finally, the pH is adjusted to 5.4–5.5. Crystallization is accomplished after 24 hours, and the crystals have the form of sharp-edged rhombohedrons bounded by plane crystal faces.

Example 9

100 milligrams of crystalline insulin originating from ox-pancreas are dissolved in 10 millilitres of 0.01 N HCl, and to this solution are added 10 millilitres of an aqueous zinc chloride solution containing 0.05% of zinc. 20 millilitres of an aqueous potassium bromide solution containing 15 grams of KBr per 100 millilitres are then added, and then 10 millilitres of the sodium acetate buffer mentioned in Example 8 are added, whereafter the pH is adjusted to 5.4–5.5. Crystallization is completed after 1–2 days, and the crystals have the form of sharp-edged rhombohedrons bounded by plane crystal faces. The halogen ion concentration during crystallization is about 0.55 mole per litre.

Example 10

4 grams of crystalline insulin originating from ox-pancreas are dissolved in 100 millilitres of an acidic, aqueous zinc chloride solution containing 20 milligrams of zinc and 4 millilitres of 1 N HCl per 100 millilitres. To this solution are added 50 millilitres of an aqueous potassium iodide solution containing 20 grams of potassium iodide per 100 millilitres, and 50 millilitres of a sodium acetate buffer containing 2.72 grams $$CH_3COONa.3H_2O$$

and 2 millilitres of 1 N NaOH per 50 millilitres, and the pH is then adjusted to 5.4–5.5. The halogen ion concentration will then be about 0.32 mole per litre. Crystallization is completed after 1–2 days, and the crystals have the form of sharp-edged rhombohedrons bounded by plane crystal faces.

Example 11

1 gram of amorphous insulin is suspended in 100 millilitres of an aqueous solution containing 1 millilitre of zinc chloride solution containing 1% zinc ions, 1 millilitre of 1 N HCl, 7 grams NaCl and 1.36 grams of $CH_3COONa.3H_2O$.

The mixture is agitated about 2 days which causes the insulin to crystallize in the form of sharp-edged rhombohedrons bounded by plane crystal faces. The halogen ion concentration during crystallization is about 1.2 moles per litre.

Example 12

250 milligrams of insulin are suspended in 5 millilitres of water and dissolved by addition of as small an amount of 0.1 N NaOH as possible (about 2 millilitres). Excess of NaOH should be avoided as insulin cannot stand alkaline treatment.

The slightly alkaline insulin solution is mixed with 100 millilitres of an aqueous solution having the same composition as described in Example 11. The insulin crystallizes in the course of some hours in the form of sharp-edged rhombohedrons with plane crystal faces. The halogen ion concentration is the same as in Example 11.

Example 13

The following two stock solutions are prepared:
(A) 3.48 grams of insulin crystals derived from ox-pancreas and containing 0.78% of zinc are suspended in 50 millilitres of water and dissolved by addition of 4 millilitres of 1 N HCl. The solution is diluted with water to 100 millilitres.

(B) 1/50 M sodium acetate and 45 grams triethanolamine hydrochloride are dissolved in water to 100 millilitres containing so much NaOH that the mixture of (A) and (B) has a pH of 5.5.

The solutions (A) and (B) are mixed in a beaker and in the course of some hours the insulin crystals appear in the form of sharp-edged rhombohedrons with plane crystal faces.

*Example 14*

2.40 grams of insulin crystals derived from ox pancreas and containing 0.8% of zinc are suspended in 50 millilitres of water and dissolved by addition of 22 millilitres of 0.1 N HCl whereafter the solution is diluted with water to 100 millilitres. To this solution are added 80 millilitres of an aqueous urea solution containing 22 grams of urea, and 20 millilitres of a solution prepared in the following manner:

50 grams of citric acid are dissolved in 200 millilitres of water. To this solution there are added 28.5 grams of NaOH and 200 millilitres of a zinc chloride solution containing 1% of zinc ions, whereafter the solution is diluted with water to 500 millilitres.

The pH of the crystallization mixture is adjusted to 6.0 by means of 1 N NaOH and the mixture is stirred slowly. In the course of some hours the insulin crystallizes in the form of sharp-edged rhombohedrons bounded by plane crystal faces.

*Example 15*

1.20 grams of insulin crystals derived from ox pancreas and containing 0.8% of zinc are suspended in 66 millilitres of water and dissolved by addition of 1.6 millilitres of 1 N HCl. To this solution are added 22.5 grams of formamide and 10 millilitres of a solution prepared in the following manner:

50 grams of citric acid are dissolved in 200 millilitres of water. To this solution are added 28.5 grams NaOH and 200 millilitres of an aqueous zinc chloride solution containing 1% zinc ions whereafter the solution is diluted to 500 millilitres.

The pH of the crystallization mixture is 6.0 and after stirring for some hours the insulin has crystallized in the form of sharp-edged rhombohedrons bounded by plane crystal faces.

The insulin crystals produced according to the above examples may be separated from the crystallization medium by filtration, decantation or centrifugation and freed from adhering traces of the crystallization medium by washing, for example with acetone.

When the crystallization process forms a step in the production of injectable insulin preparations comprising an aqueous suspension of crystalline insulin the crystallization medium may be given such a composition that it is suitable for use as suspension medium for the insulin crystals of the injectable insulin preparations. In such case it is preferred to use sodium chloride as the halogen salt in the crystallization process.

The following example illustrates this embodiment of the crystallization process according to the invention, which makes it superfluous to separate the insulin crystals from the crystallization medium and to wash and dry the crystals.

*Example 16*

2 millilitres of an aqueous zinc chloride solution containing 1% zinc ions are mixed with 4 millilitres of 1 N HCl and diluted with water to 100 millilitres. 80,000 international units of crystalline insulin are dissolved in this solution which is then sterile-filtrated and mixed under aseptic conditions with 100 millilitres of a sterilized aqueous solution containing 2.72 grams of $$CH_3COONa.3H_2O$$

14 grams NaCl and 2 millilitres of 1 N NaOH. The crystallization is completed within about 24 hours. After dilution and addition of further amounts of zinc, if desired, and of auxiliary substances such as preserving agents and pH-regulating substances, the insulin crystal suspension may be used directly as an insulin preparation for injection.

Having thus fully described our invention we claim as new and desire to secure by Letters Patent:

1. A bovine insulin crystal having the shape of a sharp-edged rhombohedron bounded by plane crystal faces, the obtuse angle of each rhombus being between 114° and 115°.

2. An insulin preparation with protracted effect, comprising a sterile, injectable aqueous medium having a pH-value between 5 and 8 and bovine insulin crystals suspended therein, said crystals having the shape of sharp-edged rhombohedrons bounded by plane crystal faces, the obtuse angle of each rhombus being between 114° and 115°, and said suspended crystals containing chemically bound within the crystal lattice less than 6 atoms per unit cell of at least one crystallization-promoting metal when the aqueous medium has a pH-value of 7.

3. An insulin preparation as defined in claim 2, in which the aqueous medium has a pH-value of about 6.5 to 7.5.

4. An insulin preparation as defined in claim 2, in which the suspended insulin crystals contain 2 to 5 atoms per unit cell of at least one crystallization-promoting metal, when the aqueous medium has a pH-value of 7.

5. In a process of producing crystalline insulin from an insulin-containing aqueous medium having a pH-value between 5 and 7 in the presence of a crystallization-promoting metal, the step which comprises giving the aqueous crystallization medium a halogen ion concentration above 0.2 and below 4 moles per liter, said halogen ion being selected from the group consisting of chlorine, bromine, and iodine ions and being derived from at least one halogen salt selected from the group consisting of the alkali metal salts, the ammonium salts, the alkali earth metal salts, and the triethanolamine salts, the insulin thereby crystallizing in rhombohedral shape as sharp-edged crystal bodies bounded by plane crystal faces independent of the species of pancreas glands from which the insulin is derived.

6. A process as defined in claim 5, wherein the halogen ion concentration is between 0.5 and 1.5 moles per litre.

7. A process of producing crystalline insulin which comprises establishing an aqueous medium containing insulin and a crystallization-promoting metal dissolved therein and also containing an alkali salt of a halogen selected from the group consisting of chlorine, bromine and iodine in an amount to provide a halogen ion concentration between 0.5 and 1.5 moles per litre, and adjusting the pH of said medium to a value of 5.4 to 6.2, the insulin thereby crystallizing in rhombohedral shape as sharp-edged crystal bodies bounded by plane crystal faces independent of the species of pancreas glands from which the insulin is derived.

8. A process as defined in claim 7, in which the alkali metal salt is sodium chloride.

9. In a process of producing crystalline insulin from an insulin containing aqueous medium having a pH-value between 5 and 7 in the presence of a crystallization-promoting metal, the step which comprises adding to the aqueous medium urea in such an amount that the insulin crystallizes in rhombohedral shape as sharp-edged crystal bodies bounded by plane crystal faces independent of the species of pancreas glands from which the insulin is derived.

10. In a process of producing crystalline insulin from an insulin-containing aqueous medium having a pH-value between 5 and 7 in the presence of a crystallization-promoting metal, the step which comprises adding to the aqueous medium formamide in such an amount that the insulin crystallizes in rhombohedral shape as sharp-edged crystal bodies bounded by plane crystal faces independent of the species of pancreas glands from which the insulin is derived.

11. A process as defined in claim 5, wherein an organic solvent selected from the group consisting of acetone, propyl alcohol, butyl alcohol, and amyl alcohol is present in said aqueous medium to solubilize any amorphous insulin precipitated during the crystallization of the crystalline insulin.

12. A process as defined in claim 5, wherein an acetate buffer is added to the insulin-containing aqueous medium.

13. The process of producing crystalline insulin which comprises dissolving insulin in an acidified aqueous solution of a water-soluble zinc salt, sterile-filtrating the solution, and mixing said solution under aseptic conditions with a sterilized aqueous solution containing an acetate buffer and an alkali metal chloride in an amount such that the chloride ion concentration of the mixture is between 0.5 and 1.5 moles per liter, the last-mentioned aqueous solution having a pH-value such that the insulin will crystallize from the mixture in rhombohedral shape as sharp-edged crystal bodies bounded by plane crystal faces.

References Cited in the file of this patent

UNITED STATES PATENTS

| | | |
|---|---|---|
| 2,143,590 | Scott | Jan. 10, 1939 |
| 2,143,591 | Scott | Jan. 10, 1939 |
| 2,626,228 | Petersen | Jan. 20, 1953 |
| 2,779,706 | Homan | Jan. 29, 1957 |
| 2,799,622 | Schlichtkrull | July 16, 1957 |
| 2,819,999 | Schlichtkrull | Jan. 14, 1958 |